United States Patent [19]

Marschall et al.

[11] Patent Number: 5,742,562
[45] Date of Patent: Apr. 21, 1998

[54] HYDROPHONE ARRAY

[75] Inventors: Richard A. Marschall; Debra L. Marschall, both of New South Wales, Australia

[73] Assignee: Marschall Acoustics Pty Ltd, New South Wales

[21] Appl. No.: 655,031

[22] Filed: May 29, 1996

[30] Foreign Application Priority Data

May 29, 1995 [AU] Australia ................... PN3229

[51] Int. Cl.$^6$ ................... H04R 11/00
[52] U.S. Cl. ................... 367/188
[58] Field of Search ................... 367/154, 188, 367/20; 310/337, 800

[56] References Cited

U.S. PATENT DOCUMENTS 4,958,329  9/1990  Marschell ................... 367/154
5,204,843  4/1993  Beauducel ................... 367/154

Primary Examiner—Daniel T. Pihulic
Attorney, Agent, or Firm—Jordan and Hamburg

[57] ABSTRACT

A hydrophone array to perform passive and active sound imaging is described. The array is comprised of a plurality of acoustic transducers attached to a cable that may be towed behind a geophysical survey vessel. The cable and acoustic transducers are enclosed within a sheath of essentially constant external dimensions, which extends longitudinally the length of the cable and which is effective in minimizing turbulent noise created by the array during its use. The sheath may be circular or elliptical in cross-section and can enclose a jacket of resiliently flexible and positively buoyant material that encases the cable and transducers.

26 Claims, 2 Drawing Sheets

HYDROPHONE ARRAY

BACKGROUND OF THE INVENTION

The present invention relates generally to hydrophone arrays and in particular to hydrophone arrays for use as towed sensing devices.

Hydrophone arrays are used to perform active and passive sound imaging, and depend on a plurality of spaced, active sonic transducers at a controlled spacing for providing data which cannot be obtained readily from a single hydrophone.

It is known from an earlier invention described in U.S. Pat. No 4,958,329 to one of the present inventor's, namely Richard Marschall, that forming a hydrophone containing body in a suitable hydrodynamic shape reduces turbulent noise around the hydrophone sensor and increases its effectiveness. The present invention is directed to an alternative arrangement which is also effective in minimising turbulent noise during use.

SUMMARY OF THE INVENTION

In a first aspect the present invention consists in a hydrophone array comprising a cable having attached thereto a plurality of acoustic transducers, the cable and acoustic transducers being enclosed within a sheath of substantially constant external dimension and which extends longitudinally of the cable.

In a preferred embodiment of the invention, the sheath is cylindrical, of constant diameter and extends the full longitudinal length of the cable. In another embodiment, the sheath is elliptical in cross section. Preferably, the sheath comprises an overmold of plastic which provides a water-tight enclosure for the cable. Alternatively, the sheath may comprise a cylindrical hose made from a resiliently flexible material, such as neoprene or polyurethane, into which the cable and attached acoustic transducers have been drawn. Preferably, the sheath is filled with a gel, fluid, or plastic material as is appropriate for the array's application.

Each acoustic transducer is preferably comprised of a cylindrical tube of piezoelectric material mounted symmetrically on the cable. Most preferably, a strain shielding element is provided on the cable for each acoustic transducer which substantially shields the transducer from stresses generated in the cable. The strain shielding element preferably consists of a cylindrical member which fits around the cable. The cylindrical member is preferably a stiff material such as a metal, alloy, or carbon fiber.

In one embodiment, the acoustic transducer may consist of the present applicant's transducer arrangement described in Australian Patent Application No 405 18/95, the description of which is incorporated herein by reference.

In a more preferred embodiment, the cylindrical tube of piezoelectric material is comprised of at least one wrap of piezoelectric polymer or a piezo-rubber composite around the strain shielding element. More preferably, the piezoelectric polymer is wrapped a plurality of times around the strain shielding element. The length of each acoustic transducer is preferably in the range 14–28 cm.

The piezoelectric material, such as polyvinylidene fluoride (PVDF), has electrically conductive material coated on each face thereby providing an electrode for each surface. Preferably, each electrode is a thin coating of metal such as silver, gold or aluminum. To prevent electrical short circuiting between the respective wraps of polymer when wound around the strain shielding element, a non-conductive coating, such as Mylar, can be applied over the conductive electrodes. Electrical connection from the cable to each electrode of the piezoelectric material is preferably facilitated by conductive leads attached to the electrodes by a conductive epoxy or adhesive metallic tape.

In a further embodiment of the invention, the cable can be enclosed by a jacket of resiliently flexible, preferably positively buoyant, material such as rubber, polyurethane or plastic composite in which each acoustic transducer is located such that the outer surfaces of the transducers are substantially coincident with the outer surface of the jacket. In this embodiment, the sheath could encase the jacket and transducers and would preferably be comprised of a soft material such a polyvinyl chloride (PVC) or polyurethane.

In operation, the hydrophone array can be used as a towed, vertical, or seismic downhole array. Its particular arrangement is, however, most suited to a towed sensor arrangement behind a geophysical survey vessel.

The cable in such an application must provide towing forces for the acoustic transducers and the electrical and other signal connections between each acoustic transducer and associated data analysis equipment which is typically located in the vessel towing the array. Signal transmission through the cable may be through standard electrical bearers or through the use of optical fibers.

BRIEF DESCRIPTION OF THE DRAWINGS

Hereinafter given by way of example only, preferred embodiments of the invention will be described, with reference to the accompanying drawings, in which.

DETAILED DESCRIPTION OF THE INVENTION

Figure 1:
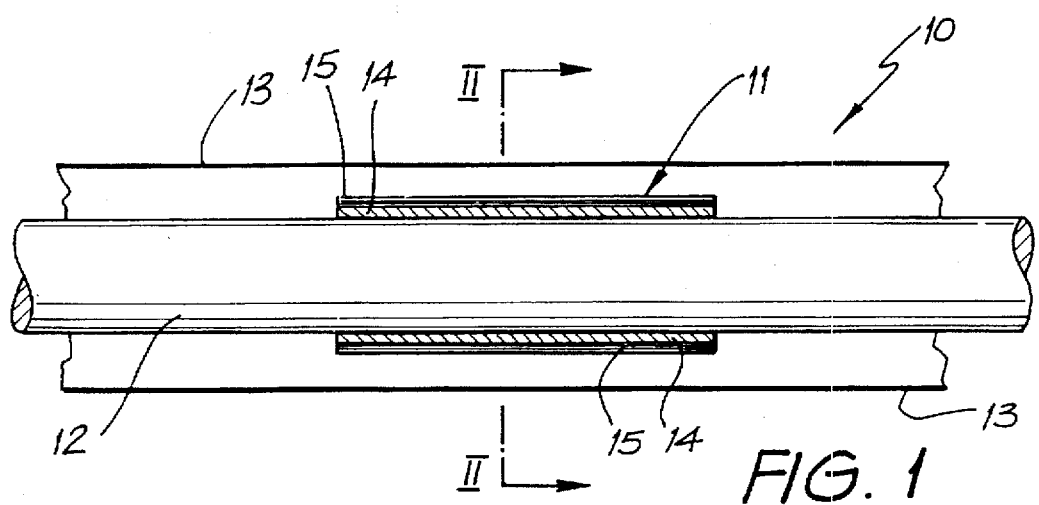
FIG. 1 is a simplified vertical cross-sectional view of one embodiment of a portion of a hydrophone array according to the present invention.

A portion of a towed hydrophone array for use in seismic and other applications is generally shown as 10 in FIG. 1.

Figure 2:
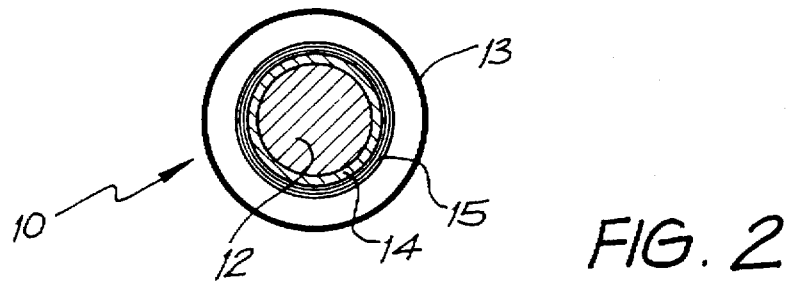
FIG. 2 is a sectional view taken through line II—II of FIG. 1.
Figure 3:
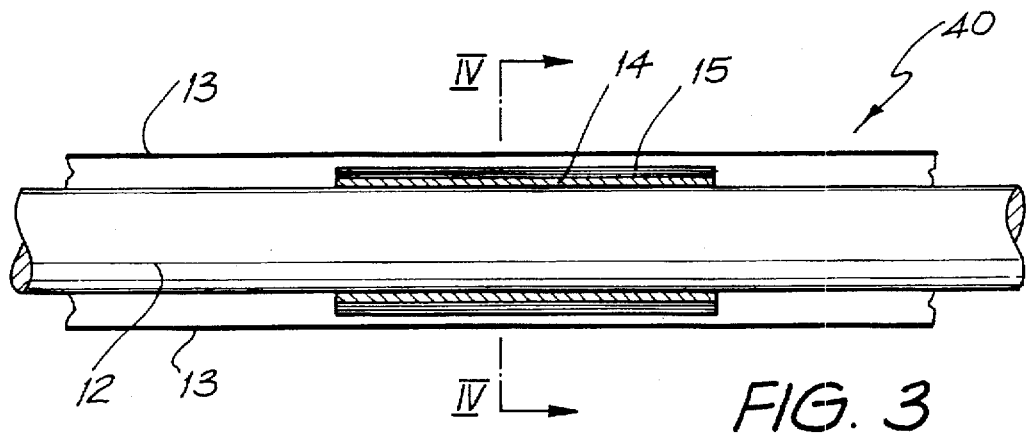
FIG. 3 is a simplified cross-sectional view of a second embodiment of a portion of a hydrophone array according to the present invention.
Figure 4:
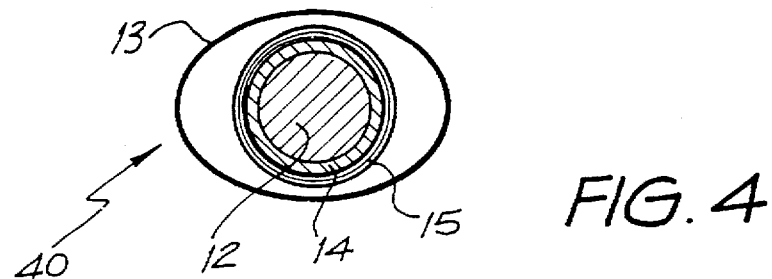
FIG. 4 is a sectional view taken through line IV—IV of FIG. 3.

The array 10 is comprised of a plurality of acoustic transducers, one of which (transducer 11) is depicted in FIGS. 1 and 2, attached to a towing cable 12. The cable 12 and plurality of transducers 11 are enclosed within the cylindrical constant diameter water-tight plastic overmold 13. In another embodiment of the array, depicted as 40 in FIGS. 3 and 4, the overmold 13 is elliptical in cross-section rather than cylindrical as depicted in FIGS. 1 and 2.

Each transducer 11 comprises a cylindrical strain shielding element 14 and a cylinder of piezoelectric material 15 arranged to be operated in hydrostatic mode. The strain shielding element 14 is made of a stiff material such as carbon fiber and acts to substantially shield the piezoelectric material 15 from stresses generated in the cable 12 during use.

The piezoelectric material 15 in the depicted embodiment is polyvinylidene fluoride (PVDF) film which has been wrapped around the outer surface of the strain shielding element 14 a plurality of times. The film is metallized on each surface with a further top layer of insulating material on each side ensuring no electrical short circuits between the two surfaces when it is wrapped around the strain shielding element 14. The outer wrap of insulating material, for example Mylar, may be metallised to provide an electrostatic shield for the hydrophone. Leads (not depicted) from the respective surfaces of the PVDF film 15 can be connected to signal conditioning electronics which is in turn interconnected to data bearers (not depicted) present in the cable 12 which allow transmission of signals generated by the PVDF to standard data analysis equipment known in the art located on a survey vessel towing the cable 12.

In operation, the array 10 having periodically spaced transducers 11 of the type described above could extend over two kilometers from the rear of the vessel.

Figure 5:
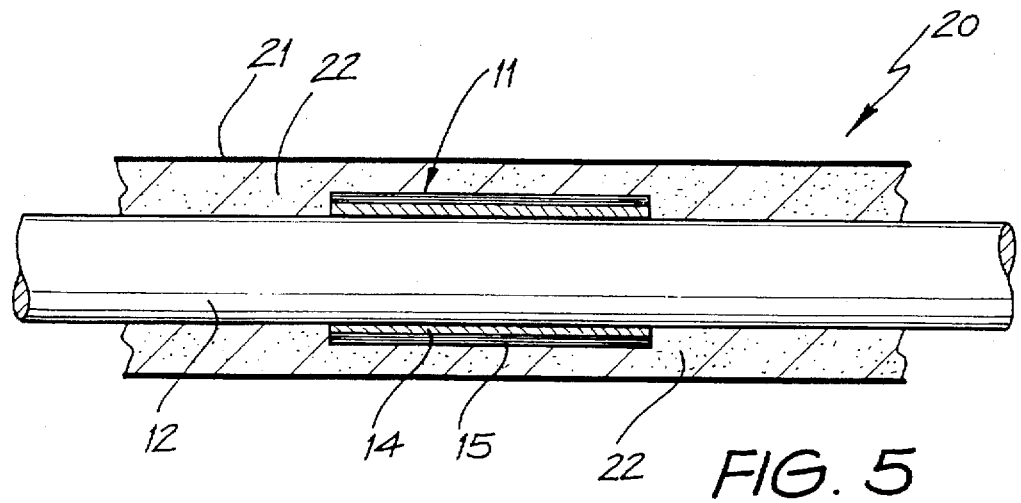
FIG. 5 is a simplified vertical cross-sectional view of a third embodiment of a portion of a hydrophone array according to the present invention.

An alternative embodiment, generally shown as 20 of the invention is depicted in FIG. 5. Like components of the device to those depicted in FIG. 1 have the same reference numerals.

In the embodiment 20 the sheath constitutes a cylindrical hose 21 through which the cable 12 and plurality of transducers 11 have been drawn. The space within the hose wall 21 is filled with an appropriate material such as gel or fluid 22 as requirements dictate.

Figure 6:
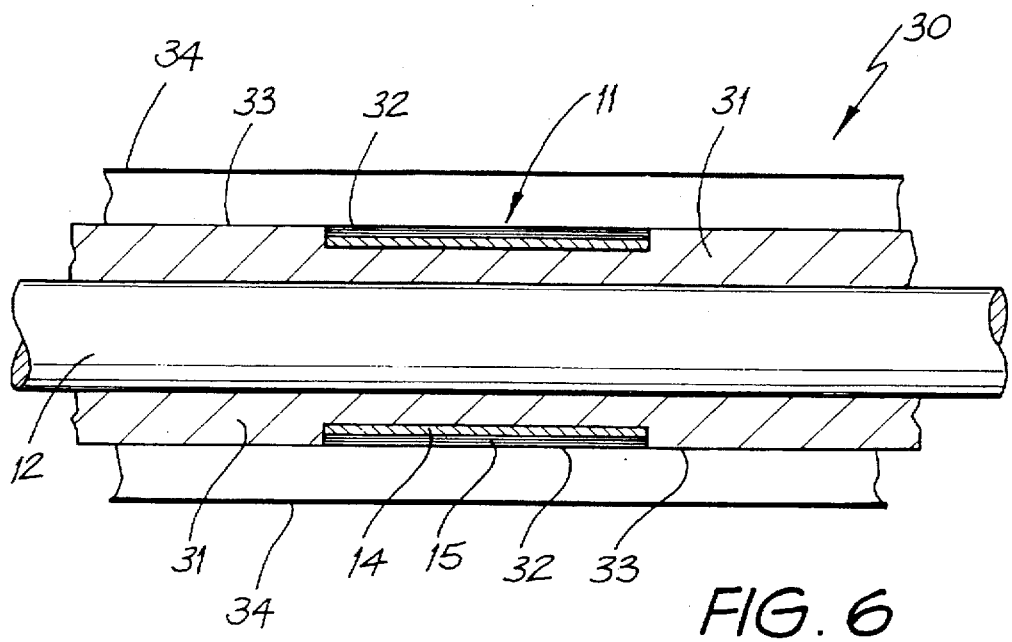
FIG. 6 is a simplified vertical cross-sectional view of a fourth embodiment of a portion of a hydrophone array according to the present invention.

Another embodiment, generally shown as 30, of the invention is depicted in FIG. 6. Once again like components of the device have the same reference numerals as those embodiments described above.

In the embodiment 30 the towing cable 12 is surrounded by a jacket of positively buoyant plastic or plastic composite material 31. Along the cable 12, each transducer 11 is so mounted such that their outer surfaces 32 are coincident with the outer surface 33 of the jacket 31. The entire arrangement is also encased in a sheath 34 comprised of a soft material such as polyvinyl chloride (PVC) or polyurethane which protects the transducers 11 from damage when the array 10 is in use.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A hydrophone array comprising a cable having attached thereto a plurality of acoustic transducers mounted symmetrically on the cable, each of said acoustic transducers comprising a tube of piezoelectric material mounted on a strain shielding element which substantially shields the acoustic transducer from stresses generated in the cable, the cable and said acoustic transducers being enclosed within a sheath of substantially constant external dimensions and extending over a longitudinal length of the cable, the sheath comprising an overmold of plastic which provides a water-tight enclosure for the cable.

2. The hydrophone array of claim 1 wherein the sheath is cylindrical and of constant diameter.

3. The hydrophone array of claim 1 wherein the sheath is elliptical in cross-section.

4. The hydrophone array of claim 1 wherein the sheath comprises a cylindrical hose made from a resiliently flexible material.

5. The hydrophone array of claim 4 wherein the resiliently flexible material is neoprene or polyurethane.

6. The hydrophone array of claim 1 wherein the strain shielding element includes a cylindrical member fitted around the cable and the cylindrical member being formed of a stiff material.

7. The hydrophone array of claim 1 wherein the tube of piezoelectric material is comprised of at least one wrap of a piezoelectric polymer wrapped around the strain shielding element.

8. The hydrophone array of claim 7 wherein a plurality of wraps of said piezoelectric polymer are wrapped around the strain shielding element.

9. The hydrophone array of claim 7 wherein the piezoelectric material is polyvinylidene fluoride.

10. The hydrophone array of claim 1 wherein the length of each of said acoustic transducers is in the range of 14 to 28 cm.

11. The hydrophone array of claim 1 wherein the cable is encased by a jacket of resiliently flexible and positively buoyant material.

12. A hydrophone array comprising:
   a cable having attached thereto a plurality of acoustic transducers mounted symmetrically on the cable;
   each of said acoustic transducers comprising a tube of piezoelectric material mounted on a strain shielding element which substantially shields the acoustic transducer from stresses generated in the cable;
   the cable and said acoustic transducers being enclosed within a sheath of substantially constant external dimensions and extending over a longitudinal length of the cable, the sheath comprising an overmold of plastic which provides a water-tight enclosure for the cable and which is filled with one of a gel, fluid, and plastic material;
   the cable being encased by a jacket of resiliently flexible and positively buoyant material; and
   each of said acoustic transducers being located in the array such that an outer surface of each of said acoustic transducers is substantially coincident with an outer surface of the jacket.

13. The hydrophone array of claim 11 wherein the sheath surrounds the jacket and the acoustic transducers and is comprised of a soft material.

14. The hydrophone array of claim 6 wherein said stiff material includes a metal.

15. The hydrophone array of claim 11 wherein said jacket of resiliently flexible and positively buoyant material is formed of rubber.

16. The hydrophone array of claim 13 wherein said soft material is polyvinyl chloride.

17. The hydrophone array of claim 1 wherein the tube of piezoelectric material is comprised of at least one wrap of a piezo-rubber composite wrapped around the strain shielding element.

18. The hydrophone array of claim 1 wherein the tube of piezoelectric material is comprised of at least one wrap of a piezoelectric polymer and at least one wrap of a piezo-rubber composite wrapped around the strain shielding element.

19. The hydrophone array of claim 6 wherein said stiff material includes an alloy.

20. The hydrophone array of claim 6 wherein said stiff material includes carbon fiber.

21. The hydrophone array of claim 11 wherein said jacket of resiliently flexible and positively buoyant material is formed of polyurethane.

22. The hydrophone array of claim 11 wherein said jacket of resiliently flexible and positively buoyant material is formed of a plastic composite.

23. The hydrophone array of claim 13 wherein said soft material is polyurethane.

24. The hydrophone array of claim 1 wherein the sheath comprising the overmold of plastic is filled with a gel.

25. The hydrophone array of claim 1 wherein the sheath comprising the overmold of plastic is filled with a fluid.

26. The hydrophone array of claim 1 wherein the sheath comprising the overmold of plastic is filled with a plastic material.

* * * * *